United States Patent [19]

Sjolund

[11] 4,403,513
[45] Sep. 13, 1983

[54] CAPACITIVE DIFFERENTIAL PRESSURE TRANSDUCER

[75] Inventor: John R. Sjolund, St. Paul, Minn.

[73] Assignee: Sundstrand Corporation, Rockford, Ill.

[21] Appl. No.: 5,936

[22] Filed: Jan. 24, 1979

[51] Int. Cl.³ .............................................. G01L 9/12
[52] U.S. Cl. ...................................... 73/718; 73/706; 361/283
[58] Field of Search ................. 73/718, 706, 724, 722; 361/283

[56] References Cited

U.S. PATENT DOCUMENTS

| | | | |
|---|---|---|---|
| 2,753,515 | 7/1956 | Rickner | 361/283 |
| 2,800,796 | 7/1957 | Westcott et al. | 73/718 |
| 2,907,320 | 10/1959 | Weese et al. | 73/718 |
| 3,000,215 | 9/1961 | Atanasoff et al. | 73/718 |
| 3,354,721 | 11/1967 | Fiske | 73/718 |
| 3,995,493 | 12/1976 | Nishihara | 73/722 |
| 4,120,206 | 10/1978 | Rud | 361/283 |

Primary Examiner—Donald O. Woodiel
Attorney, Agent, or Firm—James A. Wanner; Ted E. Killingsworth; Harold A. Williamson

[57] ABSTRACT

A capacitive differential pressure transducer for sensing the difference in pressure between at least two fluids includes first and second halves of a housing separated by a diaphragm which acts as a common capacitive plate to the capacitive differential pressure transducer with each housing half being identical and containing an interior chamber which is filled with a force transmitting fluid, a sensing capacitive plate located within the chamber and cooperating with the common capacitive plate, a fastening mechanism for holding the sensing capacitive plate tight against its housing half, sealing devices for sealing in the force transmitting fluid and terminals for connecting the common capacitive plate and the sensing capacitive plate to a sensing circuit.

14 Claims, 4 Drawing Figures

CAPACITIVE DIFFERENTIAL PRESSURE TRANSDUCER

BACKGROUND OF THE INVENTION

This invention relates to a capacitive differential pressure transducer and, more particularly, to a pressure transducer which is simple and economical to manufacture.

Capacitive differential pressure transducers are known in the art. For example, one such capacitive differential pressure transducer involves two cup shape metal housing halves having circular cavities therein filled with a glass or ceramic material fused to each of the housing cavities. Each glass section is ground off to a concave surface which is covered with a thin metal coating forming the two sensing capacitive plates of the capacitive differential pressure transducer. When the housing halves are joined, a common capacitive plate is inserted between the housing halves and cooperates with the thin metal coating capacitive plates. The chambers on either side of the common capacitive plate are filled with fluid which communicates through channels in the housing to cavities formed in the outer surfaces of the housing halves over which are located sealing diaphragms which receive pressure from the fluid the differential pressure of which is to be sensed. As can be readily seen, this form of capacitive differential pressure transducer is complex and costly to manufacture.

SUMMARY OF THE INVENTION

A simpler and more economical capacitive differential pressure transducer for sensing the difference in pressure between at least two fluids is disclosed having first and second housing halves separated by a diaphragm forming a common capacitive plate. Each housing half is identical and includes an interior chamber filled with a force transmitting fluid, a sealing means between this chamber and an input port, the input port receiving one of the fluids to be sensed, a sensing capacitive plate located within the interior chamber and held against its corresponding housing half by a fastening mechanism, and terminals connected to the common capacitive plate and the sensing capacitive plate for connecting these plates to a sensing circuit.

BRIEF DESCRIPTION OF THE DRAWINGS

These and other features and advantages will become apparent from a detailed consideration of the invention when taken in conjunction with the drawings in which.

DETAILED DESCRIPTION OF THE DRAWINGS

Figure 1:
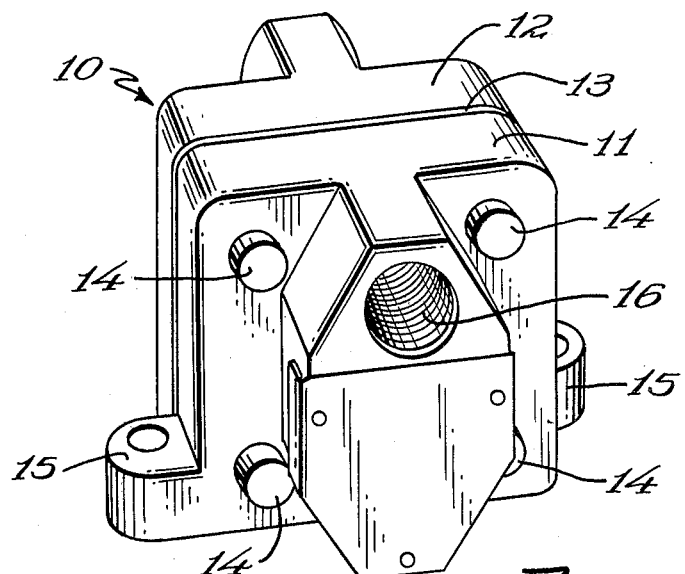
FIG. 1 is a perspective view of the capacitive differential pressure transducer.
Figure 2:
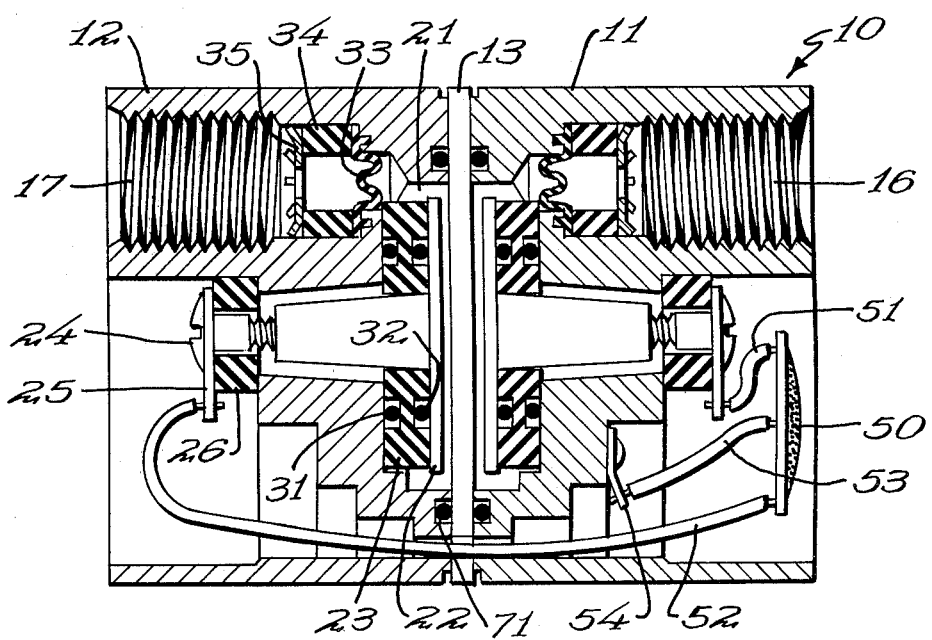
FIG. 2 is a cross-sectional view of the capacitive differential pressure transducer according to the instant invention.

In FIGS. 1 and 2, the capacitive differential pressure transducer 10 comprises housing halves 11 and 12 which are identical and separated by a common capacitive plate or diaphragm 13. Housing halves 11 and 12 are secured together by suitable fasteners such as bolts 14 as shown. Each housing half may also include flange 15 having a bore extending therethrough for fastening capacitive differential pressure transducer 10 to another body. As shown in FIG. 1, housing half 11 has input port or bore 16 extending therethrough for connection to one input and housing half 12 has input port 17 extending therethrough for connection to another input fluid. Transducer 10 senses the differential pressure between these two fluids.

Since the housing halves 11 and 12 are identical with the exception of where the electronics 50 are located only housing half 12 will be discussed in detail it being understood that the same elements appear in housing half 11.

Chamber 21 is formed in the housing half within which is located sensing capacitive plate 22. Sensing capacitive plate 22 is tightened against first insulative washer 23 by screw or fastening means 24 operating against terminal 25 and second insulative washer 26. As shown, first insulative washer 23 abuts against an interior wall of housing half 12 whereas second insulative washer 26 abuts against an opposite facing wall of housing half 12 such that, when screw 24 is tightened into sensing capacitive plate 22, housing half 12 is pinched between first insulative washer 23 and second insulative washer 26 for securely holding sensing capacitive plate 22 within housing half 12. Suitable o-rings 31 and 32 are located between first insulative washer 23 and the wall of housing half 12 against which it abuts and between first insulative washer 23 and sensing capacitive plate 22 respectively. Suitable o-ring 71 is located between housing half 12 and diaphragm 13. Chamber 21 is filled with a force transmitting fluid such as silicon oil and o-rings 31, 32 and 71 seal chamber 21 against leakage of the oil to the outside of housing half 12. Diaphragm 33 is retained within input port 17 by a spacer ring 34 and a circular "push on" retaining ring 35.

The description of housing half 12 so far is identical with the contents of housing half 11. The only difference between the two housing halves is when sensing circuit 50 is inserted into capacitive differential pressure transducer 10. As can be seen, this circuit is joined to each capacitive plate through wires 51 and 52 and it is to be noted that each sensing capacitive plate is insulated from its associated housing halves 11 and 12. Leads 53 provides the common terminal which is connected by terminal 54 to housing half 11 which, as can be seen, is directly connected to common capacitive plate 13. For manufacturing purposes however, housing halves 11 and 12 are identical in shape and geometry and contain the same elements except when sensing circuit 50, which may be a microelectronic circuit, is inserted into transducer 10.

Figure 3:
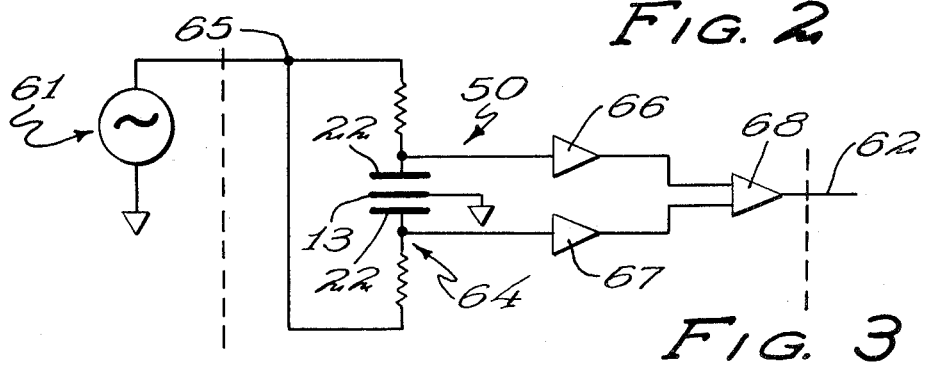
FIG. 3 is a diagram of the electronics contained within the housing of the capacitive differential pressure transducer.

FIG. 3 shows the circuit 50 which, when in use, may be connected to a source of alternating current 61 and to output terminal 62. Circuit 50 includes bridge circuit 64 comprising capacitive plates 13 and 22. Eacn sensing capacitive plate 22 is connected through a resistance to common input terminal 65. The junction of each resistor and its associated sensing capacitive plate 22 is connected to corresponding amplifiers 66 and 67 the outputs of which are connected to the two inputs of amplifier 68. The output of amplifier 68 is then connected to output terminal 62.

Capacitive differential pressure transducer 10 is designed for sensing the difference in pressure between at least two fluids. For example, in sensing the flow through a pipe, it is quite common to use a pressure transducer for sensing the differential pressure on each side of an orifice formed within the pipe. Thus, one side of the orifice is connected to input orifice 16 and the other side of the orifice is connected to input orifice 17 of capacitive differential pressure transducer 10. The pressure within orifice 16 is transmitted by diaphragm 33 located therein to the fluid contained in chamber 21 of housing half 11. Similarly, pressure within input orifice 17 is transmitted by diaphragm 33 to the fluid contained in chamber 21. Common capacitive plate 13 will be deflected by and away from the fluid having the greater pressure towards the fluid having the lesser pressure. Thus, the capacitance between the common capacitive plate 13 and its two sensing capacitive plates 22 will vary with one increasing and one decreasing to provide a differential output through amplifiers 66, 67 and 68.

Figure 4:
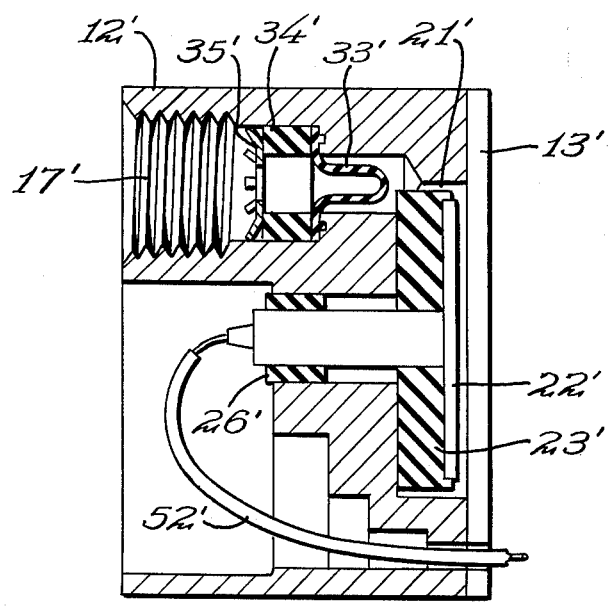
FIG. 4 is an alternate embodiment for a housing half according to the instant invention.

FIG. 4 shows an alternative embodiment for the interior of one half of pressure transducer 10, the other half being identical as suggested in FIG. 2 with the exception of the electronic circuit 50. As shown in FIG. 4, however, washer 23' is now cemented to housing half 12' by an epoxy adhesive. Capacitive plate 22' extends through housing 12' and is secured to housing half 12' by washer 26' which is pressed into the channel through which the stem of capacitive plate 22' extends and also cemented to washer 23'. Center electrode 13 is likewise cemented to housing half 12'. In this manner, washers 31, 32, and 71 as shown in FIG. 2 are eliminated. Wire 52 may be crimpled or soldered directly to the stem of capacitive plate 22'. Whereas diaphragm 33 as shown in FIG. 2 expands toward and deflates away from center electrode 13, the diaphragm 33' shown in FIG. 4 expands and deflates radially in response to changing pressure at port 17'.

The embodiments of the invention in which an exclusive property or right is claimed are defined as follows:

1. A capacitive differential pressure transducer for sensing the difference in pressure between at least two fluids, comprising:
    a housing including first and second housing halves;
    a diaphragm forming a common capacitive plate to said capacitive differential pressure transducer;
    means for securing said first and second housing halves together with said common capacitive plate mounted therebetween and in contact with said housing halves; and,
    each housing half including
        an interior chamber filled with a force transmitting fluid,
        sealing means between said chamber and an input port comprising a diaphragm located in the input port and a retaining ring for holding the diaphragm in said input port, said input port receiving one of said at least two fluids,
        sensing capacitive plate means cooperating with said common capacitive plate and including a sensing capacitive plate located within said interior chamber and a first insulative washer mounted between said sensing capacitive plate and an interior wall of said housing half,
        fastening means for holding said sensing capacitive plate means tight against said housing half, said fastening means includes a second insulative washer and a screw extending through said second insulative washer and into said sensing capacitive plate, said second insulative washer being mounted between an oppositely facing interior wall of said housing half and said fastener so that said housing half is pinched between said sensing capacitive plate and said fastener when mounted, and
        means connecting said sensing capacitive plate and said common capacitive plate to a sensing circuit, said sensing circuit comprising electronic means having inputs connected to said sensing capacitive plate in the respective housing halves and wherein said sensing circuit has a common junction connected to said housing halves.

2. The transducer of claim 1 further comprising a first o-ring mounted between said first insulative washer and said first interior wall and a second o-ring mounted between said first insulative washer and said sensing capacitive plate.

3. A capacitive differential pressure transducer for sensing the difference in pressure between at least two fluids, comprising:
    a housing including first and second housing halves;
    a diaphragm forming a common capacitive plate to said capacitive differential pressure transducer;
    means for securing said first and second housing halves together with said common capacitive plate mounted therebetween; and,
    each housing half including
        an interior chamber filled with a force transmitting fluid,
        sealing means between said chamber and an input port, said input port for receiving one of said at least two fluids,
        sensing capacitive plate means located within said interior chamber and cooperating with said common capacitive plate, said sensing capacitive plate means including a sensing capacitive plate having a stem extending through its associated housing half and a first insulative washer mounted between said housing half and said sensing capacitive plate and having an adhesive cementing said first insulative washer to said housing half,
        fastening means for holding said sensing capacitive plate means tight against said housing half including a second insulative washer pressed between said stem and said associated housing half, and
        means connecting said sensing capacitive plate and said common capacitive plate to a sensing circuit.

4. The transducer of claim 3 wherein said common capacitive plate is mounted to be in contact with said housing half.

5. The transducer of claim 4 wherein said sensing circuit has a common junction connected to said housing half.

6. The transducer of claim 5 wherein said sensing circuit comprises electronic means having inputs connected to the sensing capacitive plate in the respective housing half.

7. The transducer of claim 6 wherein said sealing means comprises a radially expandable diaphragm located in the input port and a retaining ring for holding the diaphragm in said input port.

8. A capacitive differential pressure transducer for sensing the difference in pressure between at least two fluids, comprising:

first and second identical housing halves each having an inlet port with sealing means comprising a diaphragm located in said input port and a retaining ring for holding the diaphragm in said input port and having a common capacitive plate therebetween in contact with said housing halves, each housing half including sensing capacitive plate means located within said housing half and cooperating with said common capacitive plate, said sensing capacitive plate means including a sensing capacitive plate and a first insulative washer mounted between the sensing capacitive plate and an interior wall of said housing half, fastening means for fastening said sensing capacitive plate within said housing half, said fastening means including a second insulative washer and a screw extending through said second insulative washer and into said sensing capacitive plate, said second insulative washer being mounted between an oppositely facing interior wall of said housing half and said fastener so that said housing half is pinched between said sensing capacitive plate and said fastener when mounted, and means connecting the common capacitive plate and the sensing capacitive plate to a sensing circuit wherein said sensing circuit has a common junction connected to said housing halves and includes electronic means having inputs connected to the sensing capacitive plate in the respective housing halves.

9. The transducer of claim 8 further comprising a first o-ring mounted between said first insulative washer and said first interior wall and a second o-ring mounted between said first insulative washer and said sensing capacitive plate.

10. A capacitive differential pressure transducer for sensing the difference in pressure between at least two fluids, comprising:

first and second identical housing halves having a common capacitive plate therebetween, each housing half including sensing capacitive plate means located within said housing half and cooperating with said common capacitive plate, said sensing capacitive plate means including a sensing capacitive plate having a stem extending through its associated housing half and a first insulative washer mounted between said housing half and said sensing capacitive plate and having an adhesive cementing said first insulative washer to said housing half, fastening means for fastening said sensing capacitive plate within said housing half, said fastening means including a second insulative washer pressed between said stem and said associated housing half, and means connecting the common capacitive plate and the sensing capacitive plates to a sensing circuit.

11. The transducer of claim 10 wherein said common capacitive plate is mounted to be in contact with said housing half.

12. The transducer of claim 11 wherein said sensing circuit has a common junction connected to said housing half.

13. The transducer of claim 12 wherein said sensing circuit comprises electronic means having inputs connected to the sensing capacitive plate in the respective housing half.

14. The transducer of claim 13 wherein said sealing means comprises a radially expandable diaphragm located in the input port and a retaining ring for holding the diaphragm in said input port.

* * * * *